US008798351B2

(12) United States Patent
Ding et al.

(10) Patent No.: US 8,798,351 B2
(45) Date of Patent: *Aug. 5, 2014

(54) SYSTEM AND METHOD FOR IMPROVED REAL-TIME CINE IMAGING

(71) Applicant: The Ohio State University, Columbus, OH (US)

(72) Inventors: Yu Ding, Columbus, OH (US); Orlando P. Simonetti, Columbus, OH (US); Yiu-Cho Chung, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,549

(22) Filed: Mar. 11, 2013

(65) Prior Publication Data

US 2013/0266239 A1   Oct. 10, 2013

Related U.S. Application Data

(63) Continuation of application No. 13/532,377, filed on Jun. 25, 2012, now abandoned, which is a continuation of application No. 12/426,113, filed on Apr. 17, 2009, now Pat. No. 8,208,709.

(60) Provisional application No. 61/045,786, filed on Apr. 17, 2008.

(51) Int. Cl.
*G06K 9/00* (2006.01)

(52) U.S. Cl.
USPC .......................................................... 382/131

(58) Field of Classification Search
USPC ......................................................... 382/131
See application file for complete search history.

(56) References Cited

U.S. PATENT DOCUMENTS

| 5,546,472 | A | * | 8/1996 | Levin | 382/131 |
|---|---|---|---|---|---|
| 5,710,833 | A | * | 1/1998 | Moghaddam et al. | 382/228 |
| 5,872,865 | A | * | 2/1999 | Normile et al. | 382/224 |
| 5,995,644 | A | * | 11/1999 | Lai et al. | 382/131 |
| 6,292,575 | B1 | * | 9/2001 | Bortolussi et al. | 382/118 |
| 6,377,206 | B1 | * | 4/2002 | Petty | 342/159 |
| 7,187,794 | B2 | * | 3/2007 | Liang et al. | 382/131 |
| 7,245,747 | B2 | * | 7/2007 | Oosawa | 382/128 |
| 7,916,909 | B2 | * | 3/2011 | Khazen et al. | 382/128 |
| 8,208,709 | B2 | * | 6/2012 | Ding et al. | 382/131 |
| 2002/0164061 | A1 | * | 11/2002 | Paik et al. | 382/131 |
| 2003/0076988 | A1 | * | 4/2003 | Liang et al. | 382/131 |
| 2003/0229278 | A1 | * | 12/2003 | Sinha | 600/407 |
| 2010/0138422 | A1 | * | 6/2010 | Mattiuzzi | 707/740 |

\* cited by examiner

*Primary Examiner* — Rodney Fuller
(74) *Attorney, Agent, or Firm* — Meunier Carlin & Curfman, LLC

(57) ABSTRACT

A cine imaging filter and method of use that includes a denoising image-filter based on the Karhunen-Loeve transform along the temporal direction to take advantage of the high temporal correlation among images. The cine imaging filter may further include the application of a simple formula describing the quantitative noise reduction capabilities of the KLT filter as a function of eigenimage cutoff. Additionally, the filter may validate its accuracy in numerical simulation and in in-vivo real time cine images. Furthermore, exemplary embodiments of the cine imaging filter may employ a technique to automatically select the optimal eigenimage cutoff to maximize noise reduction with minimal effect on image information.

18 Claims, 8 Drawing Sheets

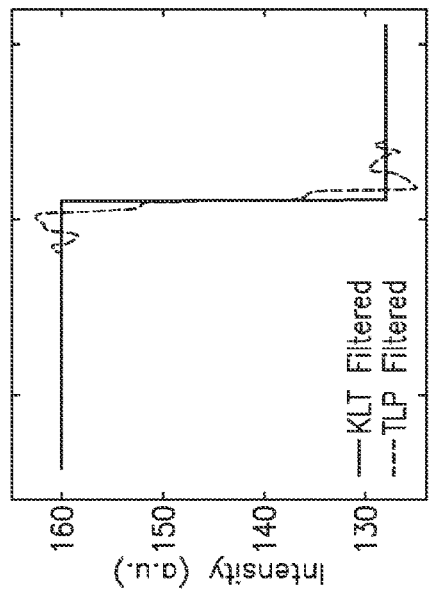
FIG-4a
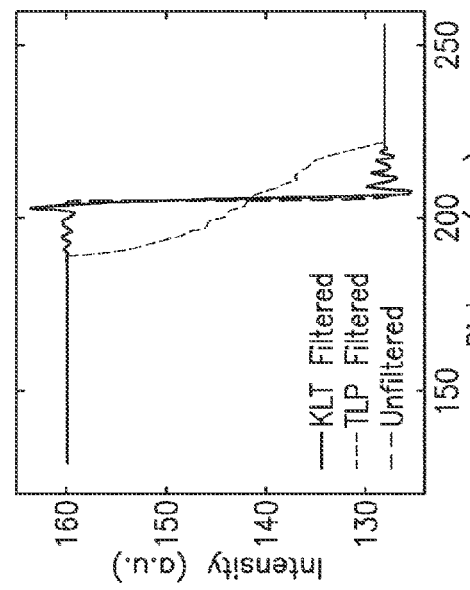
FIG-4b
FIG-4c
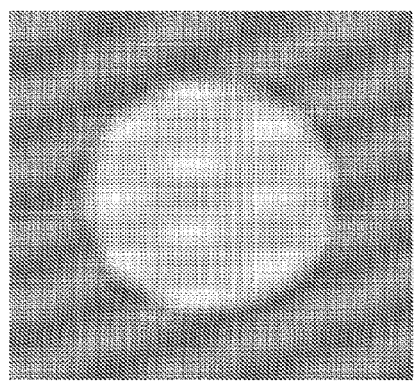
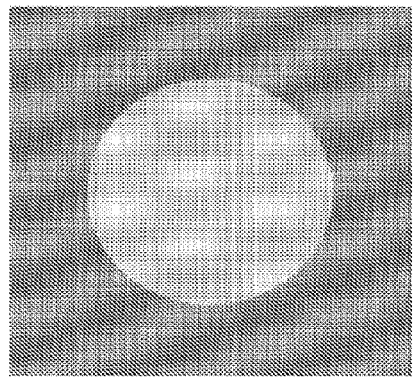
FIG-4d
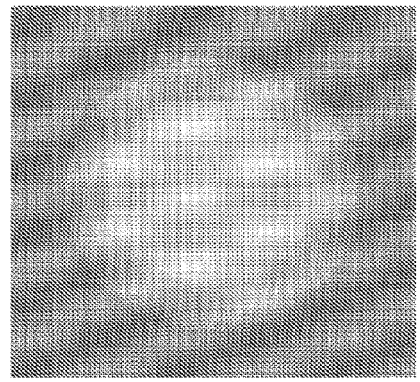
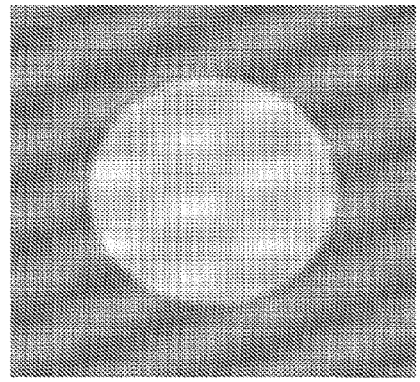
FIG-4e
FIG-4f

SYSTEM AND METHOD FOR IMPROVED REAL-TIME CINE IMAGING

CROSS REFERENCES TO RELATED APPLICATIONS

This application is continuation of U.S. patent application Ser. No. 13/532,377, filed Jun. 25, 2012, entitled SYSTEM AND METHOD FOR IMPROVED REAL-TIME CINE IMAGING, now abandoned, which is a continuation of U.S. patent application Ser. No. 12/426,113, filed Apr. 17, 2009, entitled SYSTEM AND METHOD FOR IMPROVED REAL-TIME CINE IMAGING, now U.S. Pat. No. 8,208,709, issued Jun. 26, 2012, which claims priority to U.S. Provisional Patent Application Ser. No. 61/045,786, filed Apr. 17, 2008, both of which are incorporated by reference as if fully recited herein.

FIELD OF THE INVENTION

The present invention relates systems and methods for dynamic imaging. In particular, the present invention is directed to a system and method for improving dynamic imaging by applying a Karhunen-Loeve Transform Filter to improve signal to noise ratio or temporal resolution in dynamic imaging.

BACKGROUND OF THE INVENTION

In magnetic resonance imaging (MRI), the requirements for acquisition speed (or temporal resolution), spatial resolution and signal-to-noise ratio (SNR) often compete with each other. This competition is especially apparent in real-time MRI where spatial resolution and SNR performance may be sacrificed to achieve the temporal resolution needed to capture dynamic physiological events. For example, parallel imaging techniques such as SMASH [1] and SENSE [2] greatly reduce scan time, facilitating dynamic real-time imaging of rapid physiological processes such as cardiac motion. However, these techniques come with a SNR penalty and may compromise the diagnostic value of the images.

Filters based on linear transforms, such as the Fourier transform, are often used for image denoising. Spatial low-pass filters are commonly used to improve SNR of individual images [3]. In dynamic imaging, SNR may be further improved by temporal filtering. Averaging and spectral filtering are two commonly used Fourier transform based temporal filtering techniques [4].

Linear transform based filters have three common steps: (i) transform image/images to a linear combination of "modes"; (ii) truncate the insignificant "modes" and, (iii) inverse transform the remaining significant modes to reconstruct the filtered image/images. The optimal number of "modes" truncated in (ii) must balance the SNR improvement with image sharpness and fidelity. An optimal linear transform concentrates information into fewer "modes", allowing more irrelevant "modes" to be truncated, and gives SNR gains with minimal information loss. The selection of the optimal transform and optimal filter cutoff are primary considerations in the design of any linear transform filters for image denoising.

Dynamic imaging of physiological processes generates series of images that usually show a high degree of temporal correlation. Physiological motion or signal changes are often periodic (e.g., cardiac or respiratory motion), or slowly varying (e.g., contrast agent-induced signal changes) compared to the temporal resolution of the imaging technique. Typically, either condition leads to series of images with substantially similar features in the temporal dimension.

SUMMARY OF THE INVENTION

Exemplary embodiments of the present invention may be directed to a filter based on the Karhunen-Loeve Transform (KLT) along the temporal direction for denoising real-time dynamic magnetic resonance (CMR) images.

In general, the KLT is an optimal signal compression method in the least squares sense. The KLT is a linear transform that exploits signal correlations to reduce a high dimensional data set (a large number of modes) into lower dimensions [3] (with information concentrated into a smaller number of modes) by transforming the original data into a set of orthogonal eigenimages. Using this transform, most of the variance is contained in the first few eigenimages. By removing the eigenimages associated with low variance, noise may be reduced.

Noise reduction by KLT filter was first described by Sychra et al. [5]. It has also been proposed for SNR improvement in 20 images [6, 7], including cardiac nuclear scintigraphy imaging [8, 9, 10]. In prior methods using noise reduction by KLT filters for cardiac imaging applications, images of the heart were limited to one single cardiac cycle. While the images within one heartbeat are correlated, redundancy is limited because the heart changes shape from one image frame to the next. Conversely, when images span multiple heartbeats, redundancy is increased and the KLT may achieve higher levels of noise reduction. KLT filtering has also been proposed for CMR perfusion imaging [11].

Although KLT filters have been proposed for other medical imaging applications, the details of KLT image-filter design have not been well addressed. More specifically, the choice of eigenimage cutoff and its effect on SNR gain and image sharpness have not been fully understood. The lack of such knowledge may result in a suboptimal use of an optimal transform filter.

The Karhunen-Loeve Transform Filter improves signal to noise ratio in dynamic imaging. The Karhunen-Loeve (KL) transform (also called PCA), when applied to a series of dynamically changing images, reduces noise while introducing minimal or no blurring to individual images. This KL Transform based filter (herein referred to as KLT filter) exploits the fact that dynamic images have much stronger correlation than the noise in the temporal dimension. The KLT filter works best in periodic, quasi-periodic, and near-stationary slow varying dynamic images. It may be applied to cardiac magnetic resonance imaging (MRI). Dynamic cardiac MR images acquired over multiple cardiac cycles can take best advantage of the KLT filter properties. It is very important to note that the application of KLT need not to be confined to MRI dynamic images. The KLT filter can be applied to any dynamic data set, including, but not limited to perfusion imaging of other organs such as kidney, breast, or real-time kinematic MRI, or images acquired by other modalities such as ultrasound, X-ray fluoroscopy, computed tomography, or nuclear scintigraphy.

Exemplary embodiments of the cine imaging filter for use in real-time cardiac imaging may include a denoising image-filter based on the Karhunen-Loeve transform along the temporal direction to take advantage of the high temporal correlation among images. Exemplary embodiments of the cine imaging filter may include the application of a simple formula describing the quantitative noise reduction capabilities of the KLT filter as a function of eigenimage cutoff. Additionally, exemplary embodiments may validate its accuracy in numerical simulation and in in-vivo real time cine images. Furthermore, exemplary embodiments of the cine imaging filter may employ a technique to automatically select the optimal eigenimage cutoff to maximize noise reduction with minimal effect on image information. Additionally, some exemplary embodiments of the KLT filter and method of use, with no need for a priori information, may reduce noise in dynamic real-time cardiac magnetic resonance images acquired with high parallel acceleration rates while preserving image quality. Exemplary embodiment of the cine imaging filter may be feasible and practical to overcome the low SNR often encountered in highly accelerated real-time dynamic cardiac MRI.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 4a is a simulated image of a motion artifact that has been filtered by an exemplary embodiment of a KLT filter at an eigenimage cutoff ratio equal to 0.5;

FIG. 4b is a simulated image of a motion artifact that has been filtered by a temporal LPF at a frequency cutoff ratio equal to 0.5;

FIG. 4c is a graph of an intensity profile along a radial cut line for FIGS. 4a and 4b;

FIG. 4d is a simulated image of a motion artifact that has been filtered by an exemplary embodiment of a KLT filter at an eigenimage cutoff ratio equal to 0.078;

FIG. 4e depicts simulated images of a motion artifact that has been filtered by a temporal LPF at a frequency cutoff ratio equal to 0.078;

FIG. 4f is a graph of an intensity profile along a radial cut line for FIGS. 4d and 4e;

DETAILED DESCRIPTION OF EXEMPLARY EMBODIMENT(S)

Figure 1A:
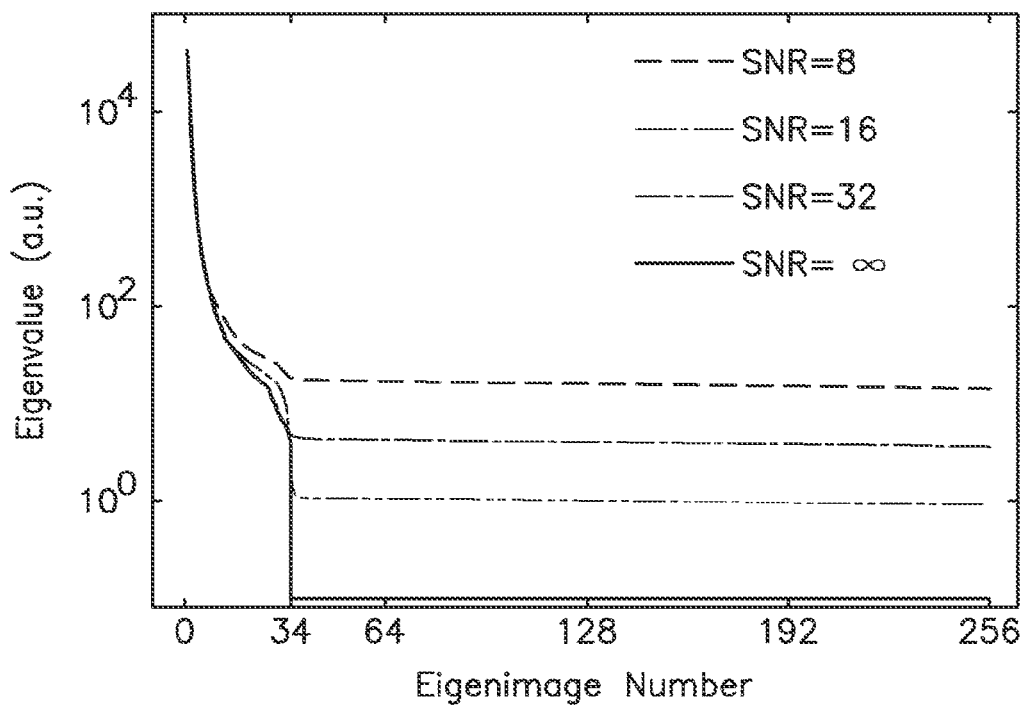
FIG. 1a illustrates an exemplary embodiment of the eigenvalue distribution in image series with various levels of signal-to-noise ratios.

A temporal series of p two-dimensional images, each with N pixels, can be represented as the matrix $\{A_i\}$, where $i=1,\ldots,p$. Each $A_i$ represents a 1-0, N point vector containing all of the pixel values for a single image. The mean is subtracted from each $A_i$, and the KLT proceeds as follows.

$$\text{Let matrix } A \left\{ \text{dimension } A = \begin{bmatrix} A_1 \\ A_2 \\ \vdots \\ A_p \end{bmatrix} \right. \tag{1}$$

Its corresponding $p \times p$ co-variance matrix $C$ is $C = AA^H/(N-1)$ (2)

where $A^H$ is conjugate transpose of A.

C has p distinct eigenvalues $\lambda_1 > \lambda_2 > \ldots \lambda_p$, with corresponding eigenvectors $v_1, v_2, \ldots, v_p$. A p×p matrix E can be constructed using p eigenvectors derived from C as rows:

$$E = \begin{bmatrix} v_1 \\ v_2 \\ \vdots \\ v_p \end{bmatrix} \tag{3}$$

Note that E is a unitary matrix, and $E^{-1} = E^T$.

The p×N-point dynamic data sets $\{A_i\}$ may be transformed by E to another p×N-point data sets $\{B_i\}$ represented by the p×N matrix B:

$$B = \begin{bmatrix} B_1 \\ B_2 \\ \vdots \\ B_p \end{bmatrix} \tag{4}$$

where, $$B = E \cdot A \tag{5}$$

The matrix E is the Karhunen-Loeve Transform for A. Unlike $\{A_i\}$, every N-point data set in $\{B_i\}$ is orthogonal to other data sets. Rearranging, $$A = E^T \cdot B = [v_1 v_2 \ldots v_p] \cdot B = \sum_{i=1}^{p} v_i \cdot B_i \tag{6}$$

That is, the dynamic data set $A_i$ is a weighted sum of a set of orthogonal data sets. Or, the data sets $\{B_i\}$ are eigenimages of the image series $\{A_i\}$.

Karhunen-Loeve Transform Filter

The eigenvalues of C in Eq. (2) weight the importance of the associated eigenvectors, and in turn the corresponding eigenimages derived from Eq. (5). In Eq. (2), when n images (n<p) in A are linearly independent, there are only n non-zero eigenvalues after applying the KLT.

In practice, random noise is present in the images, and the smallest eigenvalue will be approximately equal to the noise variance [7]. When dynamic images are (quasi-) periodic over several periods or slowly varying with time, most information is contained in a few eigenimages associated with large eigenvalues. Image noise variance can then be reduced by keeping only the m eigenimages corresponding to the m most significant eigenimages (m<p) for reconstruction in Eq. (6). Mathematically, $$\tilde{A} = E_{mT} \cdot B = [v_1 \ldots v_m 0] \cdot B = \sum_{j=1}^{m} v_j \cdot B_j \quad (7)$$

where $\tilde{A}$ are the filtered data sets and $E_{mT}=[v_1 \ldots v_m 0]$. The information content of the filtered images will not be significantly altered if the discarded eigenimages represent noise.

Noise Reduction Properties of the KLT Filter

In a KLT filter, the number of eigenimages kept m determines the level of noise reduction as well as the information retained in the filtered images. If eigenimages containing significant information content are discarded, artifacts or distortion can be introduced.

Assuming that (i) each image Ai in the dynamic series has white noise with zero mean and standard deviation $\sigma_j$, and (ii) noise among images in the series is uncorrelated, then, the noise variance $\sigma_{Bi}$ of eigenimage Bi can be shown to be given by $$\sigma_{Bi} = \sqrt{\sum_{j=1}^{p} v_{i,j}^2 \sigma_j^2},$$

where $V_{i,j}$ is the $J^{th}$ element of the eigenvector $V_i$. Hence, if noise is uniformly distributed in all images (i.e., $\sigma_1 = \sigma_2 = \ldots = \rho_p = \sigma$), then the noise standard deviation in the corresponding eigenimages is also $\sigma$ since $|V_i|^2 = 1$ for i=1, ..., p. That is, noise is also uniformly distributed in all the eigenimages. It follows that, the noise standard deviation in the t reconstructed $\tilde{A}_j$ image is $$\sigma_{\tilde{A}j} = \sqrt{\sum_{i=1}^{m} v_{i,j}^2 \sigma_j^2}. \quad [5]$$

Since the images are temporally correlated in a series of dynamic cardiac images of a single slice location, this relation can be simplified by replacing $V_{i,j}^2$ by its mean value 1/p. Then the relative noise level (RNL) of an image series, defined as the ratio of the root-mean square (RMS) noise standard deviation after and before KLT filtering, is given by:

$$RNL = \sqrt{m/p} \quad (8)$$

where m/p is the eigenimage cutoff ratio. Therefore, greater noise reduction can be achieved by either reducing m, i.e., including fewer eigenimages, or by increasing the total number of images in the series p.

There are two preconditions for Eq. (8): first, the noise has no temporal correlation; second, the noise distribution has finite variance. Although the mean RNL follows this simple equation, the RNL of each individual image may vary because of these two statistical assumptions. As no assumption is made on the spatial distribution of noise level in the image series, Eq. (8) would still hold for spatially non-uniform noise introduced by parallel imaging reconstruction.

Equation (8) is indeed true for any filters based on unitary transforms, but the meanings of m and p depend on the transform used. In Fourier filtering, p is the sampling bandwidth and m is the filter bandwidth. Therefore, Eq. (8) provides a way to compare the noise reduction properties of filters based on different transforms.

The KLT Filter and the Temporal Low-Pass Filter

A common noise reduction technique for dynamic imaging is the temporal low-pass filter (LPF) based on Fourier transform. This technique assumes that pixel intensities change slowly relative to the frame rate, and therefore the important signal content is concentrated in the low frequency band. Removing higher frequency components by a LPF is analogous to discarding eigenimages corresponding to small eigenvalues in the KLT filter. Since both the Fourier transform and KLT are unitary transforms, Eq. (8) applies in both cases. Two important differences in the properties of the two transforms lead to differences in the SNR improvement possible and the potential degradation of information content that may occur in the filtering process.

First, it has been shown that the number of KLT modes (eigenvectors) required to adequately describe a data set $m_{KLT}$ is always less than or equal to the number of Fourier basis functions $m_{FT}$ (12). That is, $m_{KLT} \leq m_{u}$, and according to Eq. (8), the SNR improvement from a KLT filter is always equivalent to or better than that from a temporal LPF for a given p. The optimality of the KLT in defining the most efficient basis set means that the KLT filter can potentially provide greater noise reduction without loss of image information, when compared to other filters using suboptimal transforms.

Second, the LPF is sensitive to image order, whereas the KLT filter is not (see Appendix A). The KLT filter relies on redundancy between images, but does not require any pattern or periodicity in the image order. Image order will affect the performance of a temporal LPF, however, since it will determine Fourier spectral bandwidth. When aperiodic or random motion appears in an image series the KLT should allow a lower filter cutoff than LPF without loss of information. This KLT filter property is particularly relevant in real time imaging of cardiac arrhythmia or other aperiodic motion.

Eigenimage Cutoff in KLT Filter

The choice of cutoff m to maximize SNR gain while minimizing information loss is one of the key issues in filter design. The goal in KLT filtering is to eliminate those eigenimages associated with non-significant eigenvalues [12] as they contain uncorrelated noise. The noise variance of the original image series may be used as a criterion for eigenvalue cutoff [13]. This approach is impractical when the noise level in the original images is difficult to measure, as can be the case in MRI when parallel imaging techniques are applied [14].

Here, a cutoff m is chosen based on the amount of structured information in the eigenimages. The degree of spatially structured information in an image is related to the width of the autocorrelation function; this can be described by its full width at half maximum (FWHM) [15]. By defining a threshold value for FWHM above which eigenimages will be kept, m is chosen based on an objective measure of the information content of the eigenimages. This method may allow m to be determined automatically from any given image series.

Methods

The use of KLT filter for noise reduction was first investigated by numerical simulation and then evaluated in real-time in-vivo cine MRI of the heart in normal human subjects. Numerical simulation and in-vivo data processing were performed using software written in Matlab 7.1 (MathWorks, Natick, Mass.) and a personal computer with single kernel Pentium IV 3.0 GHz CPU and 2.0 GB RAM.

Simulation

Numerical simulations were designed (a) to verify Eq. (8) with additive zero-mean Gaussian white noise as well as Rician white noise; (b) to test the noise reduction effect on a spatially varying noise distribution; (c) to understand the relation between noise reduction and image redundancy; (d) to determine the optimal eigenimage cutoff automatically; and (e) to quantitatively compare KLT filter performance with a temporal LPF.

The simulation used in (a) to (e) was designed to represent CMR images of the heart acquired in the short axis plane with a steady-state free precession pulse sequence [16, 17]. The model consists of a bright circle on a dark background. A series of 256 images was synthesized, each image having a 256×256 pixel matrix representing the heart at a single time point. The circle diameter was varied sinusoidally through 33 unique radii to mimic contractile heart motion. The model assumes no translational motion of the heart. The simulated cardiac motion period was set to 32.714 times the temporal interval between sequential images. In other words, the sampling rate is about 16 times the Nyquist sampling rate. This approach ensured that the number of images per cardiac cycle changed from heart-beat to heart-beat over the entire image series. This mimics the acquisition of images asynchronous with the cardiac rhythm, as in real-time cine MRI or echocardiography. The signal is defined as the pixel value difference between the bright circle and the dark background.

Noise distribution in medical images depends on the specific imaging modality [18, 19, 20]. In MRI, noise distribution also depends on both acquisition and reconstruction methods. Since most MR images are reconstructed as the magnitude of the complex MR signal, its noise follows a Rician distribution [19, 21]. Gaussian and Rician distributed noise were added to the images and the effect of filtering tested on each. Rician noise was introduced in the following way:

$$A=\sqrt{(M+N_r)^2+N_i^2} \qquad (9)$$

where A=image signal contaminated by noise, M=true image signal, Nr, N=zero-mean Gaussian white noise with standard deviation in real and imaginary part respectively. When the images were corrupted by zero-mean Gaussian white noise, the SNR was defined as signal divided by the noise standard deviation. When the images were corrupted by Rician noise, the SNR is defined as signal divided by the standard deviation of Gaussian white noise in the real or imaginary parts.

The Relationship Between Eigenimage Cutoff and Noise Reduction

Image series were synthesized with zero-mean Gaussian white noise and Rician white noise added to achieve SNR levels of 8.0, 16.0 and 32.0. In each (of the 6) case, the KLT filter was applied whereby eigenimages corresponding to the m (varying from 1 to 256) largest eigenvalues were kept. Mean of the noise standard deviation in the resulting images was measured in the background region outside of the beating circle, and the ratios of the mean noise standard deviation before and after applying the KLT filter were calculated. These values were compared to the predicted RNL defined as the ratio of the RMS noise level of the image series before and after filtering. Signal intensities were also compared before and after KLT filtering.

Spatial Variation in Noise Level

To simulate a spatially varying noise level, the same 256 image simulation was generated as described above, except that the left-half and right-half of the images were corrupted with different levels of zero-mean Gaussian white noise to generate SNR's of 8.0 and 16.0, 8.0 and 32.0, and 16.0 and 32.0 in each image half. The KLT filter with eigenimage cutoff ratio 64 was applied to the 256 image series and the mean RNL of left and right half images were compared. Each simulation was carried out multiple (400) times and the results averaged to decrease random fluctuations.

Variation in Image Series Redundancy

Since the KLT filter takes advantage of correlation between images in the original image series, images with a high degree of redundancy should demonstrate greater noise reduction after filtering than images with low redundancy. In order to understand this relation, an image series is synthesized using only 4 linearly independent images from the numerical model described above. Each of these 4 images is repeated 64, 16, 4 and 1 times, respectively to form an 85 image series, and then corrupted by zero-mean Gaussian white noise to achieve a SNR=8.0. The temporal order of the images is irrelevant to the filter performance as shown in Appendix A. Only 4 eigenimages were used in the KLT filter since this was the theoretical minimum needed to accurately reproduce image features for this simulated image series under noise-free conditions. The RNL in the 4 linearly independent images was calculated to determine the influence of redundancy. Each simulation was repeated 400 times and the results averaged as in Part A2).

Determination of Eigenimage Cutoff

The FWHM of a 2-D autocorrelation function is defined as the maximum FWHM value on the 2-D plane. The FWHM>2.0 pixels was the criterion used to determine whether a given eigenimage contained significant structure. Any eigenimage with autocorrelation FWHM : : : ; 2.0 pixels was deemed to contain noise only and was removed by the filtering process. In the numerical simulation, four SNR levels are used: 8.0, 12.0, 16.0, and 32.0. The FWHM of autocorrelation was calculated in a square region of approximately 1000 pixels in each eigenimage covering only the simulated moving structure in the images. In the noiseless scenario, the number of eigenimages that contain structured information is equal to the number of linearly independent images in the series. Because there are only 33 unique images in the simulated 256 image series, the 33rd eigenimage would be the last eigenimage containing structured information in the noiseless scenario. When noise is added, there are still only 33 information "modes"; all higher eigenimages contain only uncorrelated noise. Therefore, the 33rd eigenimage can be regarded as the last eigenimage containing significant information. Knowing this, the automatic determination of the KLT filter cutoff for the simulated series is tested with various levels of added noise by setting the threshold on the autocorrelation FWHM>2.0 pixels.

Comparison with Temporal LPF

To understand the difference between the KLT filter and temporal LPF, two comparisons were performed. The temporal LPF function was defined as unity from zero to the cutoff frequency and rolled-off using a half-Gaussian function. The KLT filter function was defined as unity for all included eigenvalues, and zero for the filtered eigenvalues.

First, the noise reduction effects of these two filters are compared by checking the RNL in the filtered images. Second, the severity of artifacts generated by these two filters is compared. Given that the goal is to image dynamic physiological processes, there is special interest in artifacts related to moving image boundaries, such as would be found at the edges of the myocardium.

In both tests, the same numerical model described above is used corrupted by zero-mean Gaussian white noise with SNR=8.0. The moving boundary moves through 33 unique radii in the series of 256 images. The image series were filtered with temporal LPF and KLT filters with frequency and eigenimage cutoff ratios ranging from $1/256$ to 1.0. The noise standard deviation in the original, KLT filtered, and temporal low-pass filtered images were measured and the RNL of both filters were plotted. The same set of images without noise was also filtered to evaluate any detrimental effects (artifacts) caused by filtering. Artifacts were defined as the difference between the original and the filtered images, and the mean standard deviation of the artifact in all the images was used as the metric of the artifact level. The mean standard deviation of the artifacts generated by each filter was plotted against the eigenimage/frequency cutoff ratio to compare the artifact levels generated by the two filters.

In-Vivo Real Time Cardiac MRI Images

Dynamic real-time cardiac magnetic resonance images were acquired in six healthy human subjects to evaluate the performance of the KLT filter applied to in-vivo cardiac images, and to compare the automatic setting of filter cutoff with expert reader opinion. All images were acquired on a 1.5T clinical MRI system (Avanto, Siemens Medical Solutions Inc., Erlangen, Germany). Untriggered, freebreathing, real-time cine series of 256 images each were acquired in short-axis, horizontal long-axis, and vertical long-axis views in each subject. The images were acquired using a real-time steady-state free precession (SSFP) cine sequence [16, 17] combined with the TSENSE [22] with acceleration factor 4. The imaging parameters were: voxel size=2.08×2.08×8 mm$^3$, 192×144 matrix, flip angle=66 degrees, temporal resolution=60.0 ms, TE=1.04 ms, bandwidth=1185 Hz/pixel, and scan time=16 seconds for each series of 256 images. A 12-element cardiac phased-array coil was used for signal reception. The average image SNR was about 20 for the blood pool under similar imaging conditions [23]. Three image series were collected from each subject.

Each image series was KLT filtered with eigenimage cutoff ratios ranging from $1/256$ to 1. For one example, the sorted eigenvalues were plotted to show that the total variance in the image series was concentrated in the first few eigenimages. The mean noise standard deviation in the original and the filtered images was defined as mean signal standard deviation in a region of interest (ROI) in the air region of each image series. In order to eliminate possible signal bias, the temporal mean intensity of each pixel was subtracted before the noise standard deviation was measured. The mean and standard deviation of the RNL of all 18 image series was plotted versus eigenimage cutoff ratio to investigate the correspondence of the RNL in in-vivo images to the predicted values.

Original and filtered image series with eight different eigenimage cutoffs: 1, 2, 4, 8, 16, 32, 64, and 128, were simultaneously presented in a 9-on-1 format to three reviewers, each with over 8 years experience in cardiac MRI. The reviewers were blinded to the filter cutoff by randomizing the order of display of the nine image series. The reviewers selected the image series that visually had the best SNR without apparent blurring or artifacts caused by filtering.

The automatic cutoff criterion defined any eigenimage with an autocorrelation FWHM>2.0 pixels as containing significant structural information. Eigenimages with lower autocorrelation FWHM were considered to contain only noise and were rejected by the filter. A paired student t-test was used to compare the eigenimage cutoffs selected by the autocorrelation method and by the reviewers.

Results

Simulation

The Relationship Between Eigenimage Cutoff and Noise Reduction

Figure 1B:
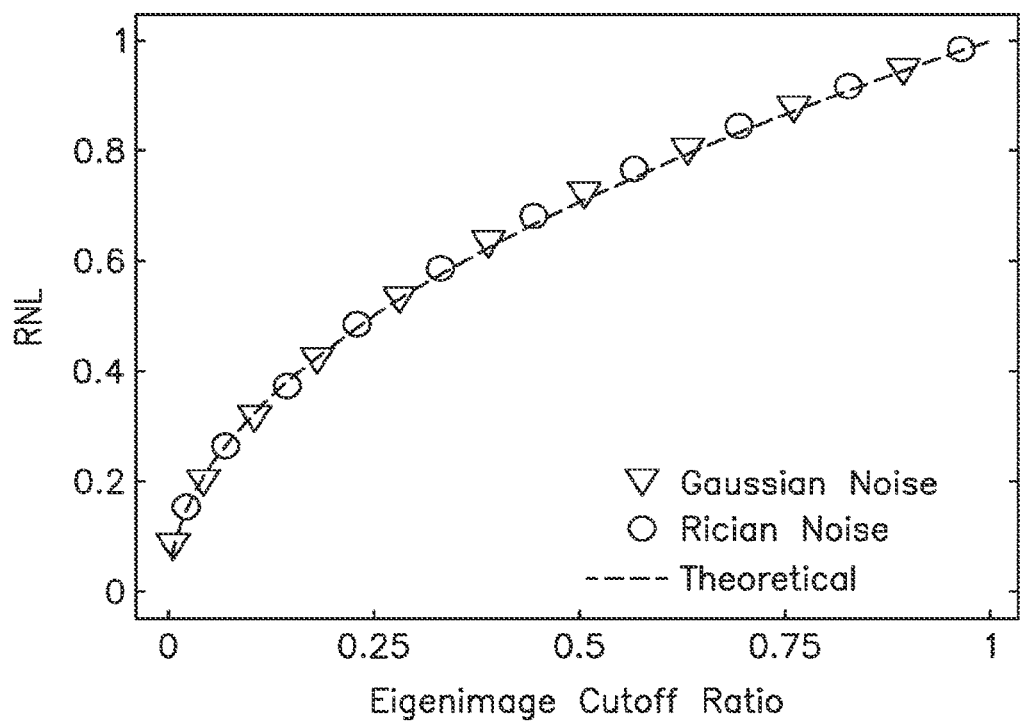
FIG. 1b is a graph of an exemplary embodiment that shows the relative noise level shown as a function of eigenimage cutoff for an image series with a signal-to-noise ratio of 8.0 achieved by addition of either zero-mean Gaussian or Rician noise.

In numerical simulation, the eigenvalues corresponding to the Gaussian white noise corrupted image series were plotted in FIG. 1a. All zero eigenvalues were set to 0.1 in order to plot on a log-scale. The first few eigenvalues are significantly larger than others. Beyond these few eigenvalues, the rest of the eigenvalues are almost identical, indicating a near constant noise floor. All image series corrupted by either zero-mean Gaussian white noise or Rician white noise with various levels of SNR showed nearly identical RNL to the theoretical predictions after KLT filtering. The maximum differences between theoretical and simulation RNL at any eigenimage cutoff ratio in image series with zero-mean Gaussian white noise were: 3.8%, 4.2%, and 4.2%; and with Rician white noise were: 3.8%, 4.2%, and 4.1%, for SNR=8.0, 16.0 and 32.0 respectively. The RNL of the zero-mean Gaussian white noise with SNR=8.0 vs. eigenimage cutoffs, and the RNL of the Rician noise with SNR=8.0 vs. eigenimage cutoffs were plotted in FIG. 1b along with the predicted values. No qualitative differences of RNL were observed between image series corrupted by zero-mean Gaussian white noise and Rician white noise. The KLT filter affected the noise level but not the signal level; the maximum difference between the original and filtered signal was less than 0.1% of the original signal regardless of the eigenimage cutoff.

Figure 2:
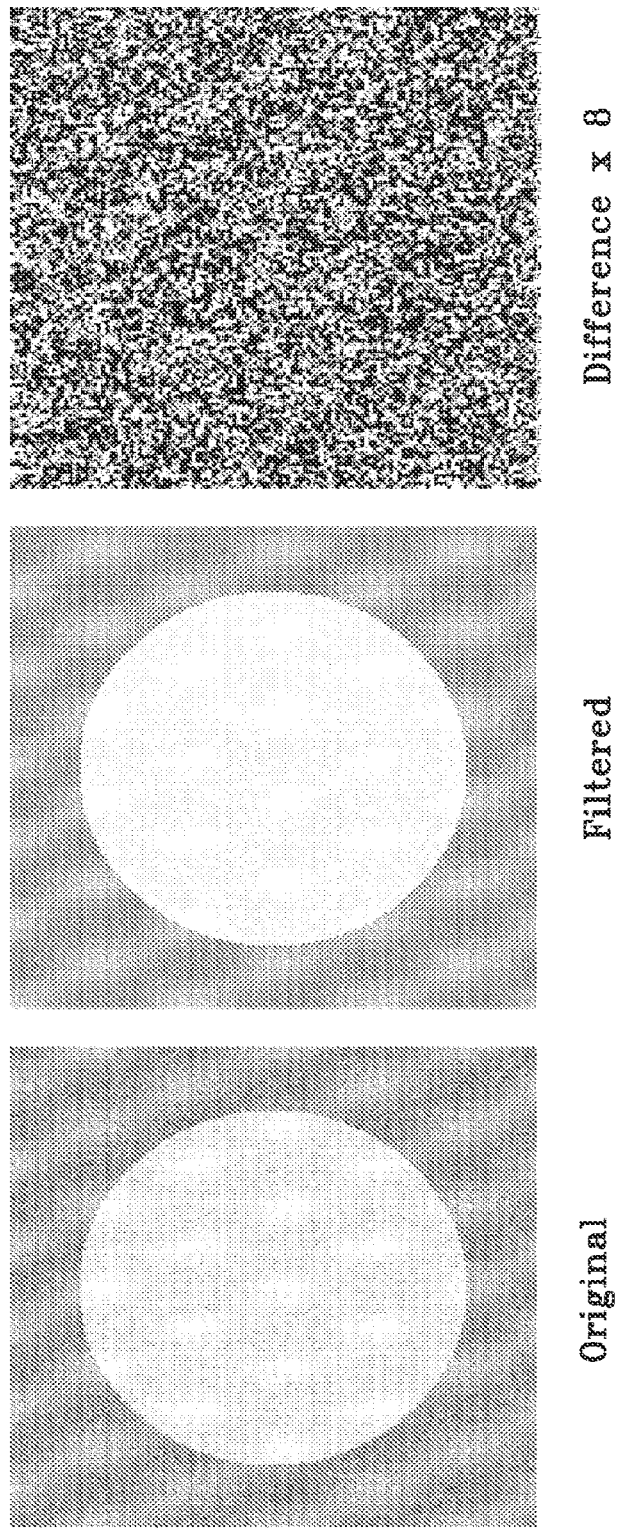
FIG. 2 is, from left to right, an original image corrupted by zero-mean Gaussian white noise, an image filtered by an exemplary embodiment of the filter, and the difference image multiplied by a factor of 8 to show any residual image structure.

FIG. 2 shows one of the original images with SNR=8.0, the filtered image with eigenimage cutoff ratio of 0.25 (keeping 64 out of 256 eigenimages), and the difference between the original and the filtered images multiplied by a factor of 8 to exaggerate any differences. There is no structure or obvious features visible in the difference images across the whole image series.

Spatial Variation in Noise Level

Table I lists the results of the simulation of spatial variation in zero mean Gaussian white noise within the image. The noise reduction ratio listed in Table I is the RNL on the right side of the image divided by that of the left side. The simulation showed a near uniform reduction in noise standard deviation, regardless of the spatial variation of noise level. The difference in noise reduction between the two sides was no larger than 3.2% even when the SNR in the left and right halves differed by a factor of 4. The standard deviation of all the listed results are smaller than 4×10$^{-6}$.

Variation in Image Series Redundancy

The average RNL±standard deviation are summarized in Table II for eigenimage cutoff=4 for the image series containing 4 images repeated 64, 16, 4 and 1 times corrupted by zero-mean Gaussian white noise with SNR=8.0. The RNL is shown to decrease as expected with increasing image redundancy.

Determination of Eigenimage Cutoff

For SNR levels of 8.0, 12.0, 16.0, and 32.0, the corresponding autocorrelation FWHM for the 33rd eigenimage was 1.7, 5.5, 7.3, and 9.6 pixels. The eigenimage cutoffs identified using the autocorrelation FWHM>2.0 pixels criterion were 29, 33, 33 and 33, respectively.

Comparison with Temporal LPF

Figure 3A:
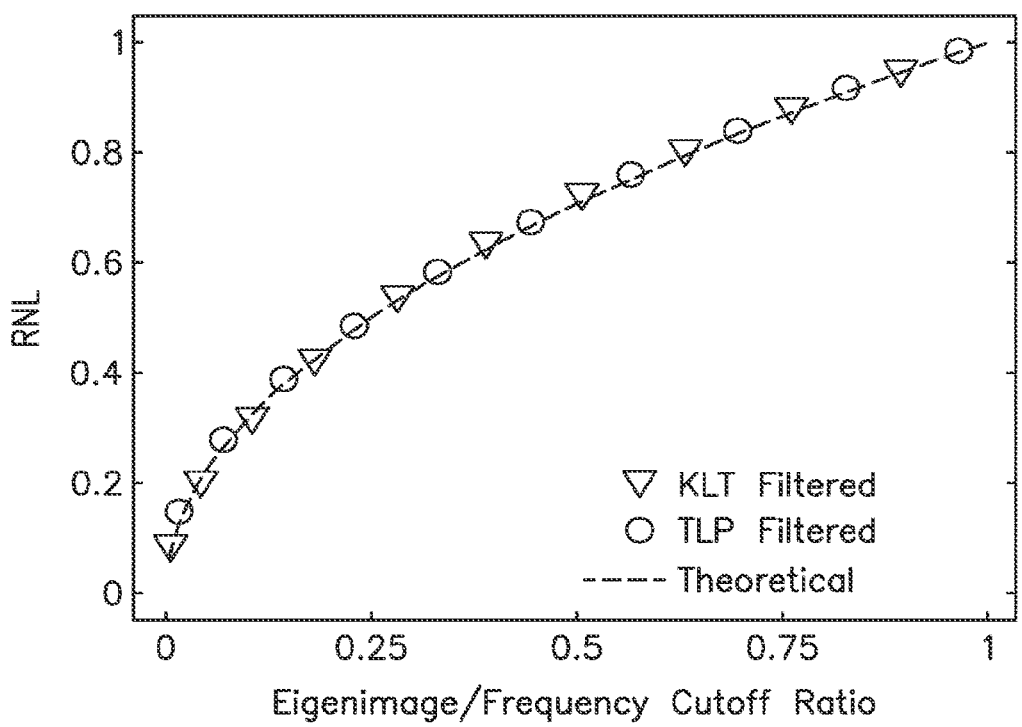
FIG. 3a is a graph that compares the relative noise level of the KLT and temporal low-pass filtered images and the theoretical prediction of an exemplary embodiment of the KLT filter and temporal LP filter at different cutoffs.
Figure 3B:
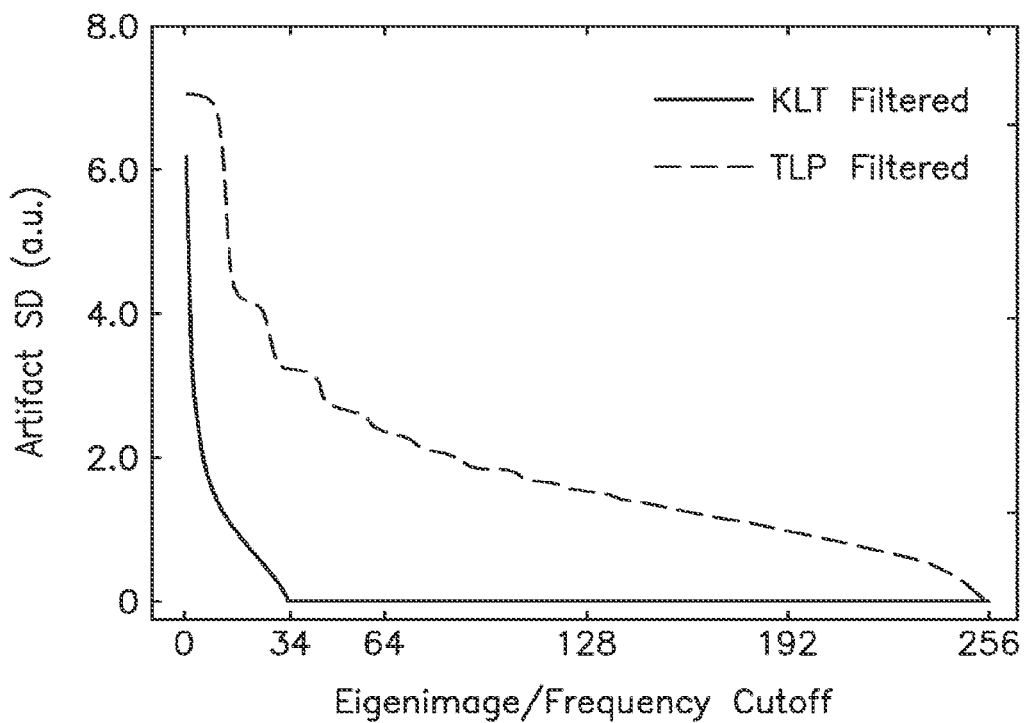
FIG. 3b is a graph that compares the standard deviation of the artifacts generated by an exemplary embodiment of a KLT filter and a temporal LP filter at different cutoffs.

The RNL for the temporal low-pass filtered and KLT filtered images were plotted in FIG. 3a, along with the predicted values. The standard deviation of artifacts generated by both filters was plotted in FIG. 3b. No artifacts were created by the KLT filter until the eigenimage threshold or cutoff number was smaller than the number of linearly independent images (33) in the original data set. However, the temporal LPF generates artifacts at any cutoff frequency. Furthermore, the artifact level of the temporal LPF is always higher than the KLT filter.

Two examples of KLT filtered image, temporal low-pass filtered image, and the boundary profiles are plotted in FIG. 4. FIGS. 4a, 4b and 4c show the first example, with eigenimage and frequency cutoff ratios=0.5. FIGS. 4d, 4e and 4f show the second example, with eigenimage and frequency cutoff ratios=0.078. This is still above the Nyquist sampling rate for the sinusoidal motion of the simulated phantom. There is no boundary profile change in the KLT filtered image in the first example because the eigenimage cutoff number is higher than the number of linearly independent images. In the second example, ringing artifact appears when the eigenimage cutoff of the KLT filter is lower than the number of linearly independent images, but the KLT filter distorts the boundary profile significantly less than the temporal LPF. The boundary profile in the KLT filtered image is still sharp, while the boundary profile of temporal low-pass filtered image spreads out over a wide range. Note that FIGS. 4c and 4f plots a horizontal radial line cut starting from the center running out to the edge of the corresponding images.

In-Vivo Real Time Cardiac MRI Images

Figure 5A:
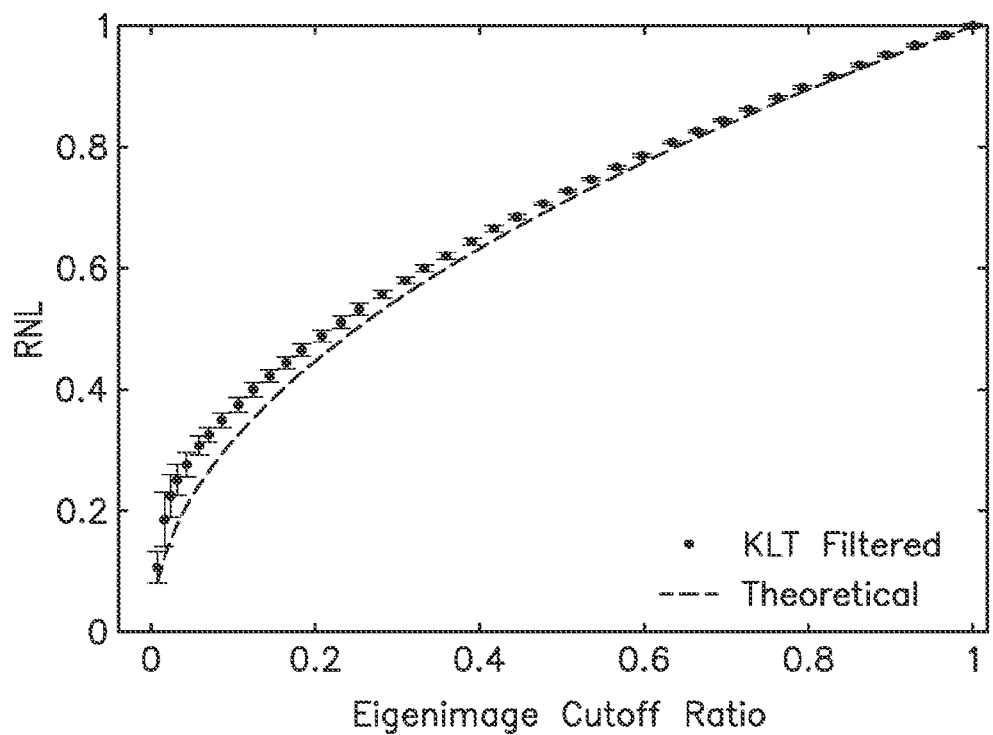
FIG. 5a is a graph that relates the relative noise level of filtered in vivo images as a function of the eigenimage cutoff ratio for an exemplary embodiment of the KLT filter.
Figure 5B:
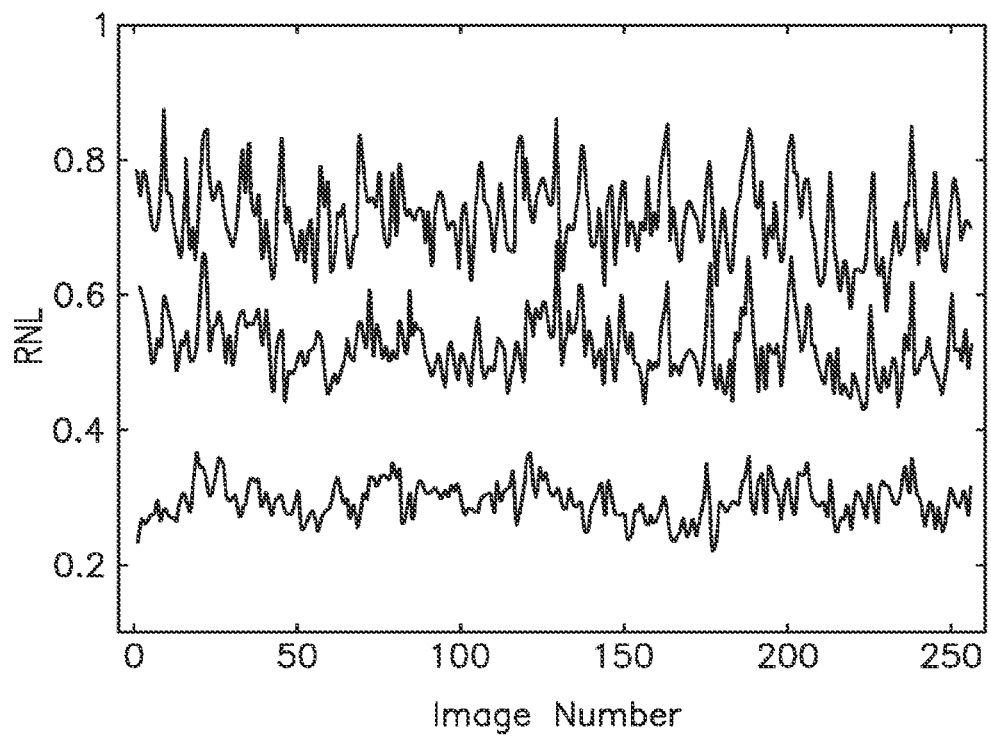
FIG. 5b is a graph of the relative noise level in each of 256 filtered images in one series when 128 (top), 64 (middle) and 32 (bottom) eigenimage cutoffs were used in an exemplary embodiment of the KLT filter.

The mean RNL in the filtered images was found to closely follow the predicted relationship to the eigenimage cutoff ratio, as shown in FIG. 5a. Some variation of the RNL across the image series was observed, as shown in FIG. 5b.

Figure 6A:
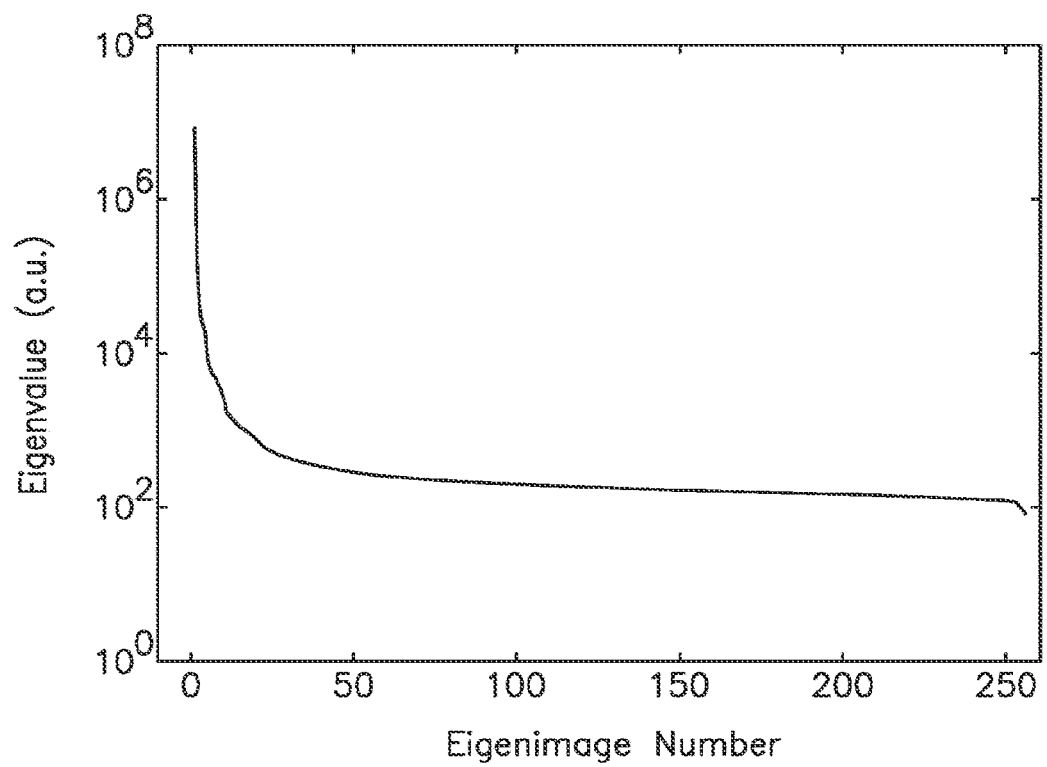
FIG. 6a is an example graph of the eigenvalue distribution in one real-time cardiac cine image series for an exemplary of the KLT filter.
Figure 6B:
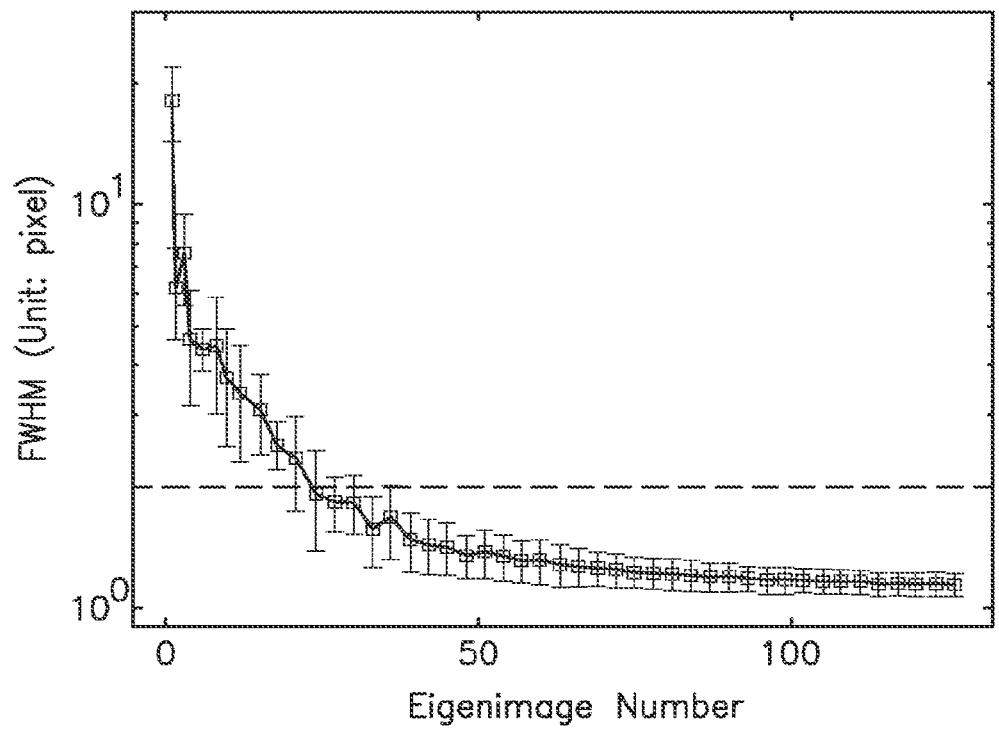
FIG. 6b is a graph of the full width at half maximum of the first 128 eigenimages averaged across 18 real-time cardiac MRI cine image series of an exemplary embodiment of the KLT filter.

FIG. 6a shows the typical distribution of eigenvalues in a real-time MRI cine series (256 images spanning 16 seconds, or approximately 20 cardiac cycles). Note that the magnitudes of the eigenvalues drop off sharply in this semi-log plot. Similar to the numerical simulation, a few eigenvalues are significantly larger than others. FIG. 6b shows the FWHM of the autocorrelation function of different eigenimages. A dashed line indicates the FWHM=2.0 pixels, which is the criterion selected to check whether or not structured information appears in the corresponding eigenimage. The mean±standard deviation of the eigenimage cutoff determined by the FWHM of the autocorrelation function method is 35±9.

Figure 7:
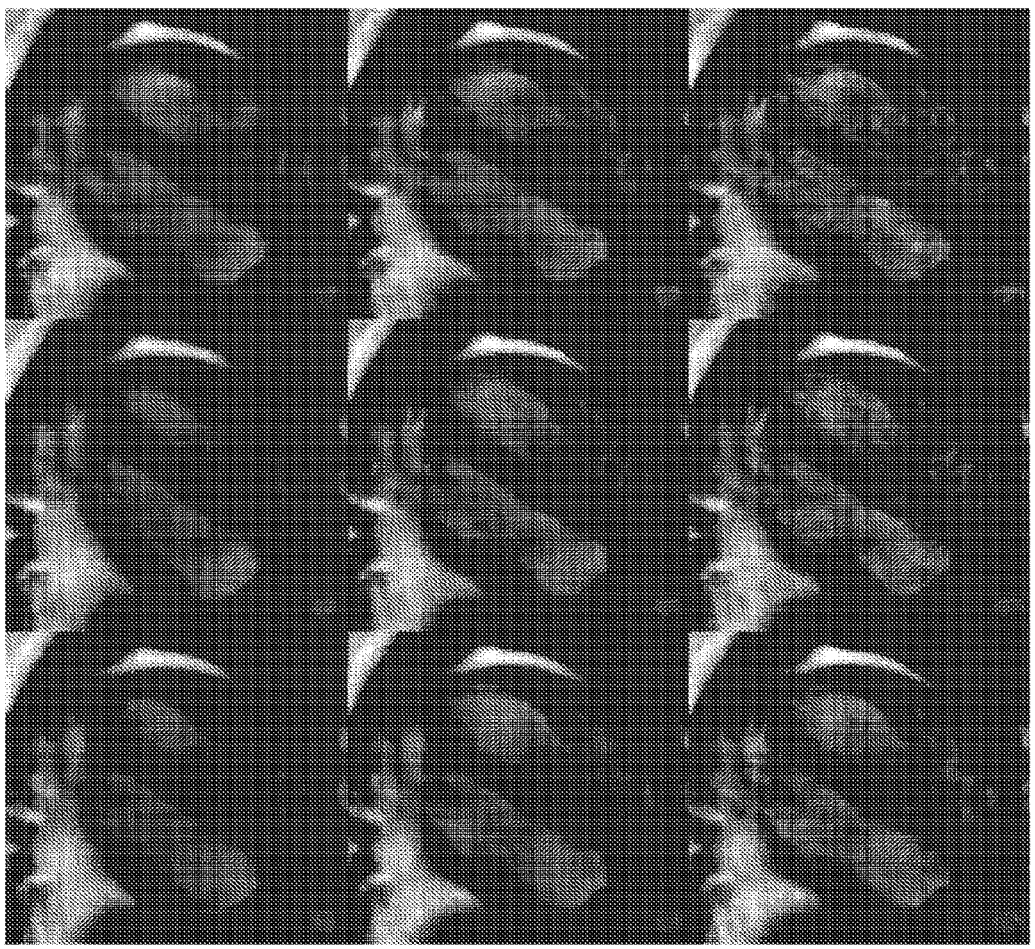
FIG. 7 illustrates one example of an original image, and the ordered filtered images at eigenimages number cutoffs 1, 2, 4, 8, 16, 32, 64, and 128 using an exemplary embodiment of the KLT filter.

FIG. 7 shows one example of the original image, and the ordered filtered images at eigenimage number cutoffs 1, 2, 4, 8, 16, 32, 64, and 128. The image order was randomized before evaluation by the three reviewers. The mean±standard deviation optimal eigenimage cutoffs selected by the three reviewers were 32±18, 23±10, and 38±16. The overall mean±standard deviation optimal eigenimage cutoff was 31±16. Paired student t-test was used to determine the agreement between the cutoffs selected by FWHM of the autocorrelation function (35±9) with those chosen by the three reviewers. One reviewer selected a significantly lower cutoff (p-value=0.001), i.e., more aggressive filtering, while the other reviewers' selections did not show statistically significant deviation (p-value=0.54 and 0.50, respectively) from the autocorrelation FWHM method. At the more conservative filter cutoff determined by the autocorrelation FWHM method, the average gain in image SNR was 144%. The data processing time for KLT filtering of the in-vivo images was 2.7 seconds for a 256 image series using routines written in MATLAB running on a Pentium IV 3.0 GHz single kernel personal computer with 2.0 GB RAM.

Discussion

Several properties of the KLT image filter were studied and the filter was applied to numerically simulated images and real time cardiac cine MR images. In all cases, the measured noise reduction was similar to theoretically predicted values. The KLT filter generated fewer artifacts and preserved the sharpness of moving edges with a RNL equal to or higher than that of the temporal LPF. The KLT filter was used successfully to reduce noise level in dynamic cardiac images without compromising image quality visually.

Simulation

The Relationship Between Eigenimage Cutoff and Noise Reduction

The number of nonzero eigenvalues in the noise-free simulated image series equals the number of unique images used in image synthesis. When the image series is corrupted by white noise, the number of nonzero eigenvalues equals to the number of images in the series. Yet, the most significant eigenvalues remain practically unchanged despite the presence of noise. (FIG. 1 a).

The simulation results show that the noise reduction in KLT filtered images closely follows the prediction of Eq. (8), as shown in FIG. 1 b. The signal level is unchanged by the filter; therefore the inverse of noise reduction is the resultant SNR gain. Thus, Eq. (8) can be used to guide the choice of m. For example, to achieve approximately the same SNR increase as would be achieved by acquiring 2 signal averages, Eq. (8) predicts that the m/p ratio should be 50%.

Aggressive filtering can lead to artifacts or information loss. Thus, the filter cutoff m cannot be selected based solely on the desired noise reduction. Only when an image series has redundancy, i.e. some images are highly correlated, can the threshold or cutoff m be smaller than p (in noiseless image series, the minimum m without information loss is exactly the number of linearly independent images).

Spatial Variations in Noise Level

The simulation results in Table I showed that noise reduction with KLT filtering is independent of spatial variations in baseline SNR and uniform throughout the image. Therefore, the SNR gain from KLT filtering is spatially uniform in dynamic MRI image series with spatially varying image noise level introduced by parallel acquisition techniques. Note that temporal low-pass filtering also has this property when applied to dynamic image series.

Variation in Image Series Redundancy

The KLT filter relies on temporal correlation; hence, data sets with greater redundancy have potential for greater noise reduction. In the case of real-time imaging of the heart, it is reasonable to assume that images acquired in one cardiac cycle are linearly independent. By acquiring images over multiple (say n) cardiac cycles, redundancy increases, and so does the attainable SNR improvement using the KLT filter. This is equivalent to increasing p in Eq. (8). Hence, if the eigenimage cutoff chosen is equal to the number of images in one cardiac cycle, then the mean RN L is approximately $1/\sqrt{n}$. This represents a "best case" scenario where images are identical from one cardiac cycle to the next. In reality, variation in cardiac rhythm and breathing motion will reduce information redundancy. Image acquisition using breath-hold or respiratory registration methods may help increase correlation between images, and hence the capacity of the KLT filter to reduce noise.

According to Eq. (8), the ratio between eigenimage cutoff and the total number of images (m/p) determines noise reduction. This ratio can be easily increased in real-time, freebreathing cardiac MRI cine with little cost by scanning longer and acquiring more images (increasing p) at the same frame rate. This is analogous to signal averaging for SNR improvement. However, averaging blurs images unless precise image registration is first performed (e.g., [14]). The KLT filter, on the other hand, does not require image registration for noise reduction with preserved image sharpness.

Determination of Eigenimage Cutoff

Simulation results showed that when the image SNR was greater or equal to 12.0, the autocorrelation FWHM>2.0 pixels generated the expected cutoff at 33 eigenimages, the number of independent images in the series. At the lowest SNR of 8.0, the FWHM criterion generated an eigenimage cutoff=29. This somewhat lower cutoff would lead to more aggressive filtering when the noise level is high in the original images. At high noise levels it is expected that some structured information may be indistinguishable from noise, and more aggressive filtering in this case would not lead to any additional loss of information. In these situations, increasing the total number of images (increasing p) will enable greater separation of information from noise.

Comparison with Temporal LPF

Simulation results demonstrated that the noise reduction effects are the same with temporal low-pass and KLT filtering if both map the original data into subspaces of the same dimension, i.e., if both types of filter use the same cutoff ratio m/p. The primary difference between the two filter types is in the introduction of artifacts. Both filters can cause ringing artifacts at moving boundaries, as shown in FIG. 4. In the KLT domain, the minimum number of eigenimages needed to generate artifact-free filtered images is the number of linearly independent images in the raw data. However, in the Fourier domain, a sharp moving edge contains the fundamental motion frequency and all harmonics. The presence of these frequency harmonics over a wide bandwidth makes temporal low-pass filtering at any frequency cutoff without introduction of artifacts or blurring impossible when the images contain sharp moving edges.

Equation (8) suggests that noise reduction achieved by KLT filtering can be improved by increasing the number of dynamic images p by increasing the image acquisition duration without changing the rate of acquisition (frame rate). However, lengthening the image series will not improve temporal low-pass filtering. In the Fourier domain, redundancy comes from sampling at a rate beyond what is necessary to faithfully represent the motion of interest. Dynamic images can be temporally filtered to increase SNR only if oversampled in this manner. Information will then be concentrated in the low temporal frequency components of the Fourier spectrum, but moving sharp edges will still be blurred as described above. Thus, pin Eq. (8) for temporal LPF can be increased by increasing the image sampling rate or temporal resolution. However, in MR imaging, increasing the temporal sampling rate generally increases noise due to increased sampling bandwidth, or the use of acceleration methods like parallel imaging. In that case, any gain in SNR by temporal filtering may be offset by the increased noise level directly or indirectly attributable to the higher sampling rate. Ideally, one should sample data at the temporal frequency that is just sufficient to represent the fastest moving structures in the image, not allowing for further temporal filtering without blurring.

It is worth noting that the KLT filter is insensitive to image order. This property is particularly relevant in noise filtering of dynamic images of aperiodic motion as may be the case with cardiac arrhythmia. Temporal low-pass filtering is expected to be less effective in these situations as aperiodic motion will increase the signal bandwidth.

In-Vivo Real Time Cardiac MRI Images

Noise reduction in the in-vivo image data followed the theoretical prediction (FIG. 5a). The filtered images demonstrated some fluctuation of RNL in different frames (FIG. 5b), probably due to randomness of the expansion coefficient as explained in the theory section.

The subjective optimal eigenimage cutoffs chosen by cardiac MR experts corresponded well with the automatic method based on the eigenimage autocorrelation FWHM. In real time cardiac cine images, this cutoff gave a RNL of 0.41, resulting in a SNR gain of 144%. This major gain in SNR was achieved at a filter cutoff qualitatively and quantitatively found to have no adverse effects on image quality. In this study, each slice was scanned for 16 seconds during free-breathing; a very reasonable scan time to sample multiple cardiac cycles provide a high level of image redundancy. While this level of SNR gain is extremely encouraging, and qualitative assessment showed no loss of image information, the autocorrelation FWHM cutoff selection criterion will require further investigation in other imaging applications.

The noise reduction results of the KLT filter applied to real-time SSFP cine accelerated by TSENSE shows the potential of this technique to improve clinical cardiac imaging performance. The filter works regardless of the spatial variations in noise caused by parallel imaging, and the SNR gain may allow for temporal or spatial resolution gains not previously practical with parallel imaging alone.

Future Applications

The KLT filter can also be applied to complex MRI data, either before or after image reconstruction. The noise level in both real and imaginary parts can be lowered, thereby lowering the signal magnitude bias caused by the noise after magnitude reconstruction. Applying the KLT filter to k-space data before image reconstruction may have the added benefit of stabilizing the numerical calculations in image reconstruction.

The KLT filter is an effective tool to enhance SNR in any form of dynamic imaging. Its potential is demonstrated here with 2-D dynamic image sets, and may be equally useful in 1-0 or 3-D dynamic image data. First-pass MR perfusion imaging, dynamic 3D MR angiography, and other imaging modalities like computed tomography (CT) and echocardiography may all benefit from this filtering technique.

The KLT filter is a memory efficient algorithm that can filter data sets larger than the computer memory compared to SVO (see Appendix 8). Using software written in Matlab and a personal computer, the computational time of KLT filtering a series of 256 in-vivo images was 2.7 seconds, comparable to the image reconstruction time of the MRI scanner. The light computational load suggests that KLT filtering can be integrated into the image reconstruction software of a commercial MRI system as an in-line filter for dynamic cardiac image series without user input. It may also be combined with traditional image processing tools such as image segmentation and registration to further optimize its performance.

Figure 8:
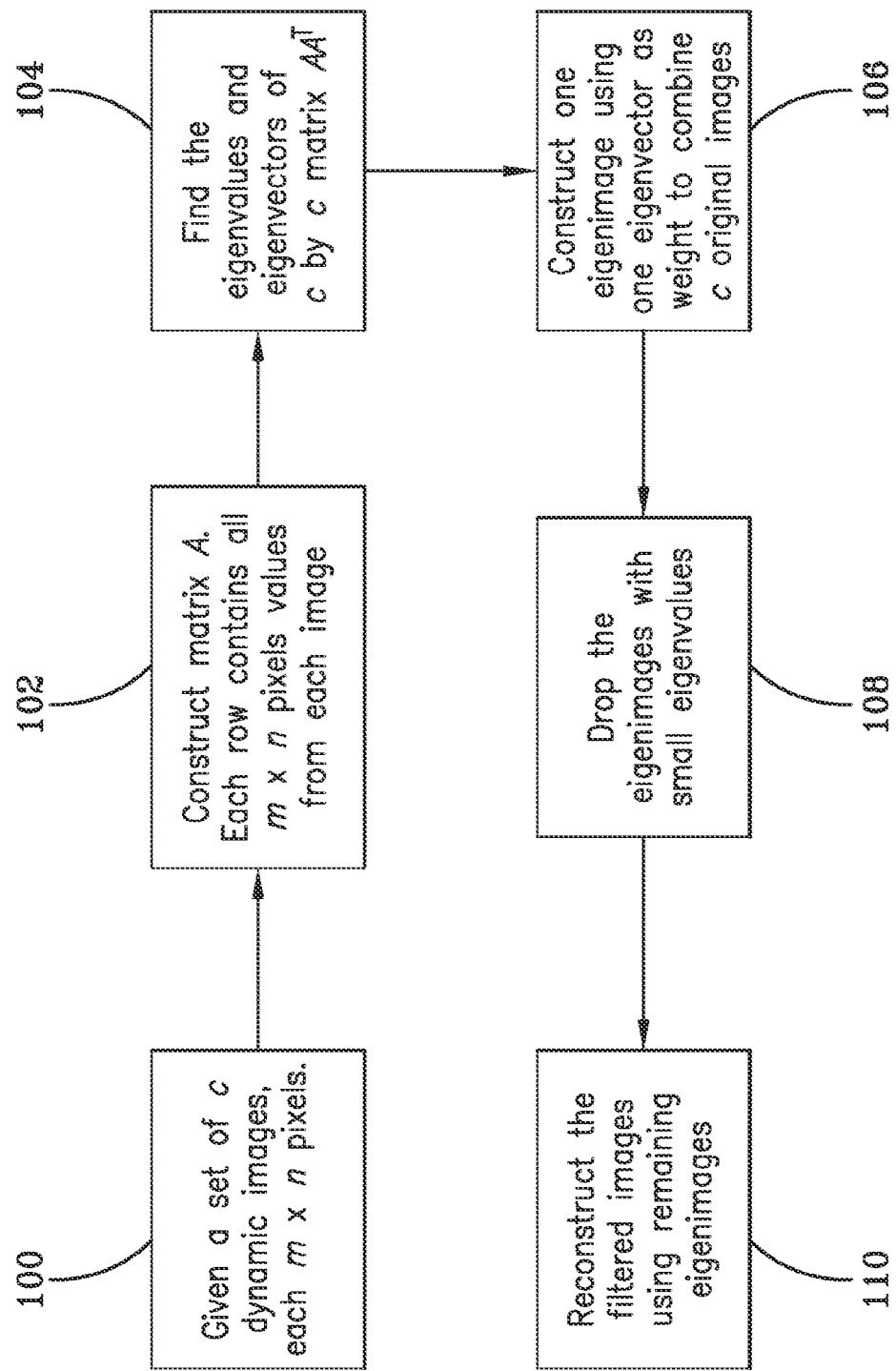
FIG. 8 illustrates a flowchart for one exemplary embodiment of the method of the present invention.

Referring now to FIG. 8, a flowchart of one exemplary embodiment of the method of the present invention. The computerized method operates on image data received from a MRI scanner and may be implemented using a 32 channel cardiac array coil. As seen therein, the method comprises providing (100) a set of c dynamic images, each with an m×n numbers of pixels; constructing (102) a matrix (A), of which each row contains all m×n pixels values from each image; finding (104) the eigenvalues and eigenvectors of a c by c matrix (AA \ constructing (106) one eigenimage using one eigenvector as weight to combine c original images; dropping (108) the eigenimages with small eigenvalues; and reconstructing (110) the images using the remaining eigenimages. In some exemplary embodiments, the method may further include the step of (not shown) acquiring the dynamic images in short-axis, horizontal long-axis, and vertical axis views.

While certain embodiments of the present invention are described in detail above, the scope of the invention is not to be considered limited by such disclosure, and modifications are possible without departing from the spirit of the invention as evidenced by the following claims:

TABLE I

SPATIALLY NON-UNIFORM NOISE REDUCTION

| Test | SNR (Left) | SNR (Right) | Noise Level Ratio (Right/Left) |
|---|---|---|---|
| 1 | 8 | 16 | 1.0243 |
| 2 | 8 | 32 | 1.0311 |
| 3 | 16 | 32 | 1.0238 |
| 4 | 32 | 8 | 0.9699 |
| 5 | 32 | 16 | 0.9768 |

TABLE II

RNL WITH VARIANT REDUNDANCY

| Eigenimage Cutoff | Redundancy | | | |
|---|---|---|---|---|
| | 64 | 16 | 4 | 1 |
| 4 | 0.1251 ± 0.0004 | 0.2500 ± 0.0008 | 0.5000 ± 0.0017 | 1.0002 ± 0.0036 |
| 5 | 0.1634 ± 0.0028 | 0.2720 ± 0.0067 | 0.5101 ± 0.0079 | 1.0003 ± 0.0034 |
| 6 | 0.1960 ± 0.0035 | 0.2935 ± 0.0088 | 0.5189 ± 0.0098 | 1.0000 ± 0.0034 |
| 7 | 0.2253 ± 0.0038 | 0.3117 ± 0.0100 | 0.5296 ± 0.0124 | 1.0003 ± 0.0036 |
| 8 | 0.2514 ± 0.0041 | 0.3306 ± 0.0111 | 0.5376 ± 0.0138 | 1.0002 ± 0.0034 |

APPENDIX A

An interesting property of KLT filter is that it is insensitive to the order of the images in a dynamic series. Suppose the image series $\{A_i\}$ is shuffled in the temporal direction. The image order change results in a new matrix, $A_p$ which can be expressed as the original image matrix A multiplied by a permutation matrix P, that is, $$A_p = PA \quad (10)$$

The new covariance matrix $C_p$ becomes $$C_p = PAA^H P^H \quad (11)$$

Since permutation matrix is unitary, the eigenvalues of $C_p$ and C are identical.

The set of new eigenvectors, $E_p$ is given by $$E_p = EP^H \quad (12)$$

The new eigenimages matrix $B_p$ are:

$$B_p = E_p A_p = EP^H PA = EA = B \quad (13)$$

That is, the eigenimages are invariant with respect to the way A is constructed from a dynamic image series. It is obviously not the case when low-pass filter is applied in the temporal direction since scrambling the order will change the temporal frequency content. If the data were originally periodic or quasi-periodic, scrambling the order is likely to broaden the frequency spectrum and diminish the effectiveness of a temporal low pass filter.

APPENDIX B

The KLT filter can also be performed using singular value decomposition (SVD) on matrix A. According to SVD theorem, $A = U\Lambda V^H$, where U and V are p×p and N×N unitary matrices, the matrix $\Lambda$ is p×N with singular values on the diagonal and zeros off the diagonal, and $V^H$ denotes the conjugate transpose of V. The first p columns of V are the p eigenimages of KLT. Similar to KLT filter, a new singular matrix $\Lambda'$ keeps only the m largest singular values in matrix $\Lambda$ to obtain the filtered images as $A' = U\Lambda'V^H$.

The KLT filter is more efficient in memory usage than the SVD filter, although they are equivalent mathematically. Only covariance matrix C has to be saved in memory in a KLT filter while the whole image series has to be saved in memory in a SVD filter.

REFERENCES

[1] D. K. Sodickson and W. J. Manning, "Simultaneous acquisition of spatial harmonics (SMASH): fast imaging with radiofrequency coil arrays," *Magn Reson Med*, vol. 38, pp. 591-603, October 1997.

[2] K. P. Pruessmann, M. Weiger, M. B. Scheidegger, and P. Boesiger, "SENSE: sensitivity encoding for fast MRI," *Magn Reson Med*, vol. 42, pp. 952-962, November 1999.

[3] R. C. Gonzalez and R. E. Woods, *Digital Image Processing*: Addison-Wesley, 1992.

[4] T. S. Huang, *Image sequence analysis: Springer Series in Information Sciences*, 1981

[5] J. J. Sychra, P. A. Bandettini, N. Bhattacharya, and Q. Lin, "Synthetic images by subspace transforms. I. Principal components images and related filters," *Med Phys*, vol. 21, pp. 193-201, February 1994.

[6] R. Montagne and G. L. Vasconcelos, "Optimized suppression of coherent noise from seismic data using the Karhunen-Loeve transform," *Phys Rev E*, vol. 74, p. 016213, July 2006.

[7] P. J. Ready and P. A. Wintz, "Information extraction, SNR improvement, and data compression in Multispectral imagery," *IEEE Transaction on communications*, vol. 21, pp. 1123-1131, 1973.

[8] O. Blagosklonov, A. Sabbah, J. Verdenet, and J. Cardot, "Application of Karhunen-Loeve transform in nuclear cardiology: spatio-temporal smoothing and quantitative image analysis," *Computers in Cardiology* 2000, pp. 299-302, 2000.

[9] M. Narayanan, M. King, E. Soares, C. Byrne, P. Pretorius, and M. Wernick, "Application of the Karhunen-Loeve transform to 4D reconstruction of cardiac gated SPECT images," *IEEE Transactions on Nuclear Science*, vol. 46, pp. 1001-1008, 1999.

[10] M. Narayanan, M. King, M. Wernick, C. Byrne, E. Soares, and P. Pretorius, "Improved image quality and computation reduction in 4-Dreconstruction of cardiac-gated SPECT images," *IEEE Transactions on Medical Imaging*, vol. 19, pp. 423-433, 2000.

[11] D. Y. Riabkov and E. V. R. Di Bella, "Improved reconstruction of dynamic cardiac perfusion MRI with use of a reference frame," in *IEEE International Symposium on Biomedical Imaging: Macro to Nano, 2004*, 2004, pp. 1047-1050.

[12] I. T. Jolliffe, *Principal component analysis*, 2nd ed. New York: Springer-Verlag, 2002.

[13] A. L. Martel and A. R. Moody, "The use of PCA to smooth functional MRI images," in *Procs medical image understanding and analysis. Manchester: British Machine Vision Association*, 1997, pp. 13-16.

[14] P. Kellman and E. R. McVeigh, "Image reconstruction in SNR units: a general method for SNR measurement," *Magn Reson Med*, vol. 54, pp. 1439-1447, December 2005.

[15] R. I. Shrager and R. W. Hendler, "Titration of individual components in a mixture with resolution of difference spectra, pKs, and redox transitions," *Analytical Chemistry*, vol. 54, pp. 1147-1152, 1992.

[16] J. C. Carr, O. Simonetti, J. Bundy, D. Li, S. Pereles, and J. P. Finn, "Cine M R angiography of the heart with segmented true fast imaging with steady-state precession," *Radiology*, vol. 219, pp. 828-834, June 2001.

[17] T. Lei and W. Sewchand, "Statistical approach to X-ray CT imaging and its applications inimage analysis," *IEEE Transctions on Medical Imaging*, vol. 11, pp. 53-61, MAR 1992.

[18] A. Macovski, "Noise in MRI," *Magn Reson Med*, vol. 36, pp. 494-497, September 1996.

[19] S. Pajevic, M. Daube-Witherspoon, S. Bacharach, and R. Carson, "Noise characteristics of 3-D and 2-D PET images," *IEEE Transactions on Medical Imaging*, vol. 17, pp. 9-23, FEB 1998.

[20] H. Gudbjartsson and S. Patz, "The Rician distribution of noisy MRI data," *Magn Reson Med*, vol. 34, pp. 910-914, December 1995.

[21] P. Kellman, F. H. Epstein, and E. R. McVeigh, "Adaptive sensitivity encoding incorporating temporal filtering (TSENSE)," *Magn Reson Med*, vol. 45, pp. 846-852, May 2001.

[22] Y. Ding, Y. Chung, T. Lanz, S. V. Raman, and O. P. Simonetti, "Improved Real-Time Cine with the use of a 32-channel cardiac array and Karhunen-Loeve Transform Filter," in *11th Annual SCMR Scientific Sessions*, Los Angeles, Calif., USA, 2008, p. 223.

What is claimed:

1. A method of filtering a set of dynamic images, comprising:
   constructing a first matrix of images from the set of dynamic images;
   applying a transform matrix comprised of eigenvectors to the first matrix to construct a series of eigenimages, the eigenimages each having an associated eigenvalue;
   determining an eigenvalue threshold value;
   discarding eigenimages having an associated eigenvalue below the eigenvalue threshold value, wherein discarded eigenimages contain uncorrelated noise; and
   determining a filtered set of dynamic images from a number of remaining eigenimages in the series of eigenimages.

2. The method of claim 1, further comprising determining the filtered set of dynamic images using Karhunen-Loeve Transform (KLT) filtering.

3. The method of claim 1, wherein the remaining number of eigenimages determines a level of noise reduction and information retained in the filtered set of dynamic images.

4. The method of claim 1, further comprising defining a relative noise level (RNL) of the set of dynamic images by the relationship $$RNL = \sqrt{\frac{m}{p}},$$

wherein m is the number of remaining eigenimages and p is a number of images in the set of dynamic images.

5. The method of claim 4, further comprising using a noise variance of the set of dynamic images to determine the eigenvalue threshold value.

6. The method of claim 4, wherein m is determined automatically from the set of dynamic images.

7. The method of claim 1, wherein a degree of spatially structured information in an image is described by its full width at half maximum (FWHM), the method further comprising:
   determining a threshold value for FWHM above which eigenimages will be kept; and
   selecting the number of remaining eigenimages based on information content of the eigenimages.

8. A tangible computer readable medium comprising computer executable instructions that when executed by a computing device perform a method of filtering a set of dynamic images, comprising:
   constructing a first matrix of images from the set of dynamic images;
   applying a transform matrix comprised of eigenvectors to the first matrix to construct a series of eigenimages, the eigenimages each having an associated eigenvalue;
   determining an eigenvalue threshold value;
   discarding eigenimages having an associated eigenvalue below the eigenvalue threshold value, wherein discarded eigenimages contain uncorrelated noise; and
   determining a filtered set of dynamic images from a number of remaining eigenimages.

9. The tangible computer readable medium of claim 8, further comprising instructions for determining the filtered set of dynamic images using Karhunen-Loeve Transform (KLT) filtering.

10. The tangible computer readable medium of claim 8, wherein the number of remaining eigenimages determines a level of noise reduction and information retained in the filtered set of dynamic images.

11. The tangible computer readable medium of claim 8, further comprising instructions for defining a relative noise level (RNL) of the set of dynamic images by the relationship $$RNL = \sqrt{\frac{m}{p}},$$

wherein m is the number of remaining eigenimages and p is a number of images in the set of dynamic images.

12. The tangible computer readable medium of claim 11, further comprising instructions for using a noise variance of the set of dynamic images to determine the eigenvalue threshold value.

13. The tangible computer readable medium of claim 11, wherein m is determined automatically from the set of dynamic images.

14. The tangible computer readable medium of claim 8, wherein a degree of spatially structured information in an image is described by its full width at half maximum (FWHM), the method further comprising executable instructions for:
- determining a threshold value for FWHM above which eigenimages will be kept; and
- selecting the number of remaining eigenimages based on information content of the eigenimages.

15. An apparatus for filtering a set of dynamic images, comprising:
- a processor;
- a memory;
- software executing on the processor an in the memory to perform:
  - constructing a first matrix of images from the set of dynamic images;
  - applying a transform matrix comprised of eigenvectors to the first matrix to construct a series of eigenimages, the eigenimages each having an associated eigenvalue;
  - determining an eigenvalue threshold value;
  - discarding eigenimages having an associated eigenvalue below the eigenvalue threshold value; and
  - determining a filtered set of dynamic images from a number of remaining eigenimages,
  - wherein discarded eigenimages contain uncorrelated noise.

16. The apparatus of claim 15, wherein the transform matrix applies a temporal filtering technique.

17. The apparatus of claim 16, wherein the temporal filtering technique is a Karhunen-Loeve Transform (KLT).

18. The apparatus of claim 15, wherein the eigenvalue threshold value is determined in accordance with a noise variance and standard deviation of an image in the set of dynamic images.

* * * * *